United States Patent
Williamson

[11] Patent Number: 5,993,134
[45] Date of Patent: Nov. 30, 1999

[54] HAND TRUCK WITH LOAD LIFTING MECHANISM

[76] Inventor: Gary Williamson, 14644 83rd La. North, Loxahatchee, Fla. 33470

[21] Appl. No.: 08/990,014

[22] Filed: Dec. 12, 1997

[51] Int. Cl.[6] .................................................. B62B 1/06
[52] U.S. Cl. .................................. 414/490; 280/47.27
[58] Field of Search ........................ 414/490, 445, 414/457; 280/47.27, 47.28, 47.29

[56] References Cited

U.S. PATENT DOCUMENTS

| | | | |
|---|---|---|---|
| 509,054 | 11/1893 | Thomas | 414/439 |
| 637,284 | 11/1899 | Richman | 280/47.27 X |
| 773,027 | 10/1904 | Peck et al. | 280/47.27 X |
| 1,342,585 | 6/1920 | Callahan | 280/47.27 X |
| 1,431,630 | 10/1922 | Cade | 280/47.27 X |
| 1,512,454 | 10/1924 | Cade | 280/47.27 |
| 1,517,951 | 12/1924 | Cade | 280/47.27 |
| 1,537,156 | 5/1925 | Baxter | 414/490 |
| 1,555,197 | 9/1925 | Fritz | 280/47.28 X |
| 1,636,574 | 7/1927 | Perry | 280/47.27 X |
| 1,709,737 | 4/1929 | Perry | 414/490 |
| 1,839,317 | 1/1932 | Jarkisz | 414/457 X |
| 1,924,885 | 8/1933 | Schreck | 414/434 |
| 2,461,203 | 2/1949 | Evans | 414/490 |
| 2,682,348 | 6/1954 | Stumphauzer | 414/490 |
| 3,035,727 | 5/1962 | Turner | 414/444 |
| 4,318,655 | 3/1982 | Svensson | 414/490 X |
| 4,921,270 | 5/1990 | Schoberg | 280/47.27 X |
| 5,017,080 | 5/1991 | Thorndike et al. | 414/490 X |
| 5,042,962 | 8/1991 | Lechnir | 414/452 |
| 5,120,183 | 6/1992 | Phillips | 414/490 |
| 5,251,922 | 10/1993 | Mann | 414/490 X |
| 5,290,051 | 3/1994 | Olson | 414/490 X |
| 5,593,271 | 1/1997 | Hall | 414/490 |
| 5,624,224 | 4/1997 | Brandenberg | 414/490 |

FOREIGN PATENT DOCUMENTS 3631783  3/1987  Germany .......................... 414/490

*Primary Examiner*—David A. Bucci
*Attorney, Agent, or Firm*—Quarles & Brady LLP

[57] ABSTRACT

A hand truck has a frame with a pair of wheels and a platform attached thereto for supporting a load during transport. A lifting arm is provided to assist in placing the load onto the platform without the user having to touch the load. The lifting arm is pivotally coupled to the frame and has a plurality of teeth. When loading the hand truck, the teeth initially contact and penetrate the box containing the load. Further movement of the hand truck toward the load causes the load to be raised by the lifting arm which allows the platform to slide underneath the load. Continued movement of the hand truck results in the lifting arm pivoting against the frame.

22 Claims, 2 Drawing Sheets

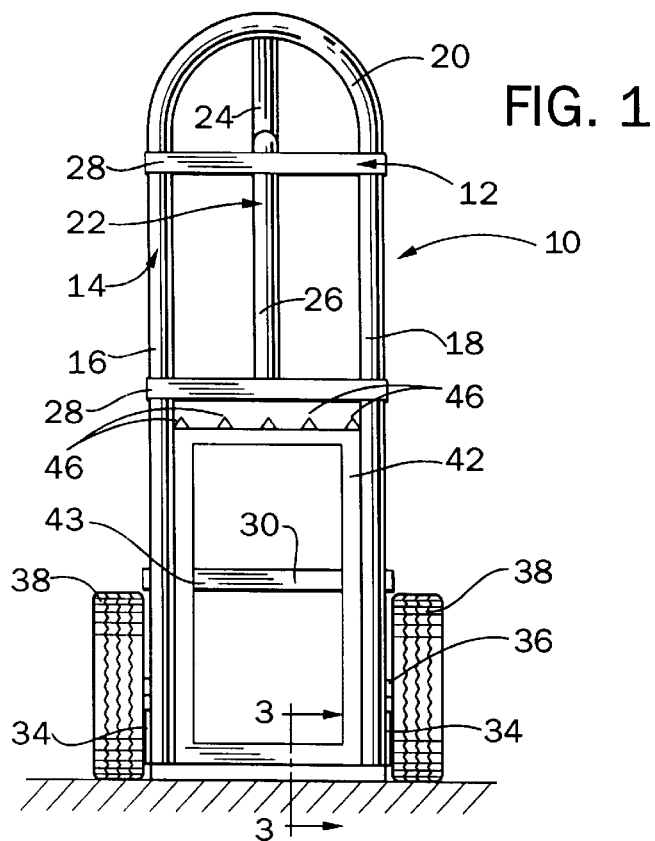
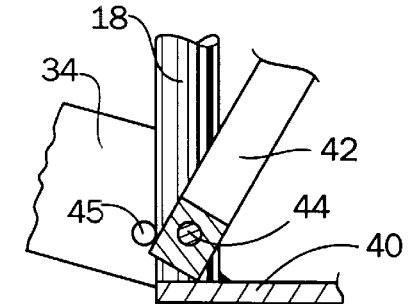
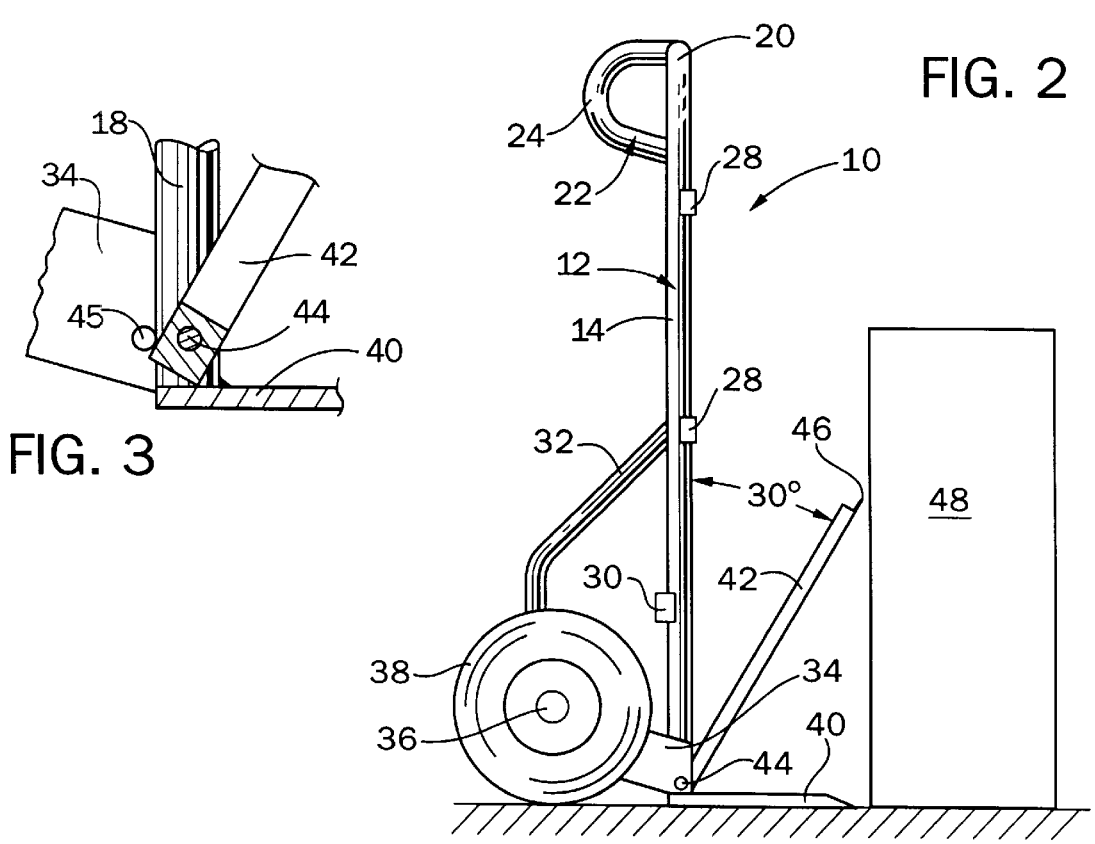

HAND TRUCK WITH LOAD LIFTING MECHANISM

BACKGROUND OF THE INVENTION

The present invention relates to hand trucks for transporting loads, such as goods contained in a box; and more particularly to such transporting devices that include a mechanism for assisting placement of the load onto the hand truck.

Hand trucks have been adapted in various ways to facilitate the carrying of loads. A typical hand truck design includes a frame with an axle at a lower end with a pair of wheels mounted on the axle. The lower end of the frame also has a bed or platform attached thereto onto which the load is positioned during transport. The upper end has either handles or at least an area designed for grasping by the user.

To use the hand truck of this type, the user positions it adjacent to the load with the platform against the floor on which the load is located. The hand truck then is pushed toward the load so that the platform slides under the load. In most cases, the load has to be tilted by hand so that the platform is able to slide thereunder. A second person may be required to tilt the load while the first person moves the hand truck. In other cases, the user has to carry the load onto the platform.

Once the load is on the platform, the hand truck is tilted about the axle by pulling the upper end away from the load while the wheels are maintained relatively stationary. This action causes the platform to lift the load off the floor and back against the tilted frame of the hand truck. The hand truck and its load then are pulled or pushed along the floor.

To unload the hand truck, the frame is lowered so that the platform again rests on the floor. Then the hand truck is pulled away from the load so that the platform slides out from under the load.

SUMMARY OF THE INVENTION

A general object of the present invention is to provide a hand truck with a mechanism that aids in sliding the platform under a load to be transported.

Another object is to provide such as mechanism that tilts the load off the floor while the platform is being slid under the load.

A further object of the present invention is to provide such a hand truck mechanism which eliminates the need to have a second person assist in the loading.

These and other objectives are satisfied by a hand truck which includes a frame having an upper portion and a lower portion. A platform is attached to the lower portion of the frame for supporting the load during transport and a pair of wheels also are connected to the frame. A lifting arm is pivotally coupled to the frame and has a device for penetrating the load. The device preferably comprises a plurality of teeth which project from a leading edge of the lifting arm.

When loading the hand truck, the device of the lifting arm first contacts and penetrates the load, such as a card board box containing the goods to be transported. However, the teeth do not penetrate into a box far enough to touch the box contents. As the hand truck moves forward, the lifting arm raises the load, thereby allowing the platform to slide underneath. Further movement of the hand truck toward the load pivots the lifting arm against the frame so that the platform is able to slide fully beneath the load. The hand truck and the load then are tilted backward in a conventional manner so that the wheels support the load off the ground.

The lifting arm automatically raises the load so that the platform can slide thereunder without the user having to touch the load. This enables a single user to place a load onto the hand truck without requiring assistance from another worker.

BRIEF DESCRIPTION OF THE DRAWINGS

FIG. 1 is a front view of a hand truck according to the present invention;

FIG. 2 is a side view of the hand truck which is about to pick-up a load;

FIG. 3 is cross section view along line 3—3 in FIG. 1;

DETAILED DESCRIPTION OF THE INVENTION

Figure 4:
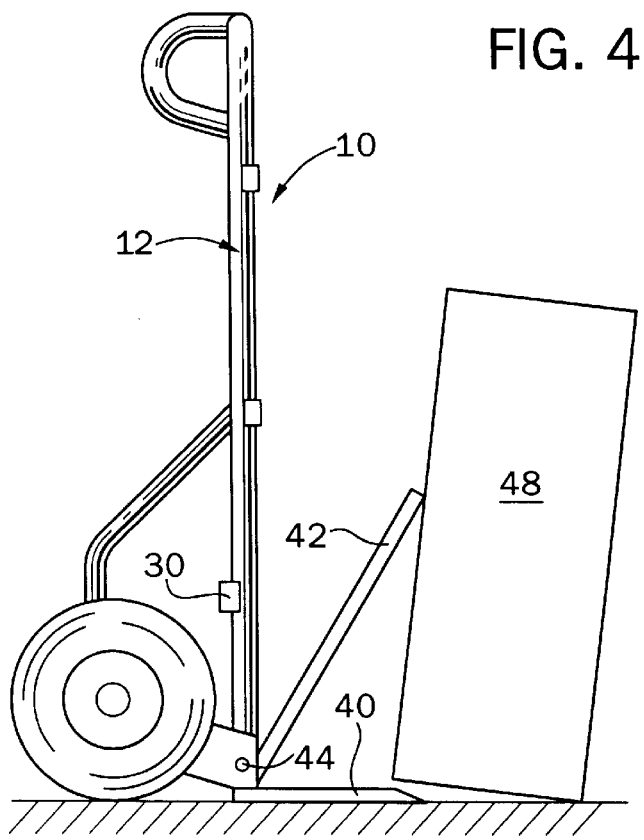
FIG. 4 is a side view of the hand truck in an intermediate state of picking-up the load.
Figure 5:
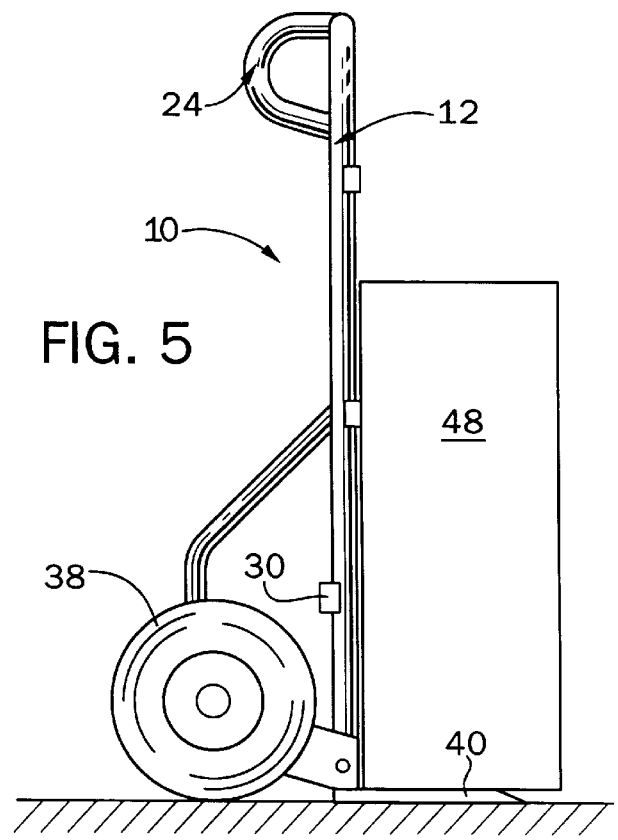
FIG. 5 is a side view of the hand truck with a load positioned thereon.

With initial reference to FIGS. 1 and 2 a hand truck 10 for transporting goods comprises a frame 12 formed of tubular steel, for example. Specifically, the frame 12 includes an inverted U-shaped member 14 formed with two spaced apart elongated legs 16 and 18 coupled by an upper curved cross member 20. A handle 22 has a bowed section 24 at one end which is welded to the center of the curved cross member 20 and bends back between the two elongated legs 16 and 18 of the inverted U-shaped frame member 14. The handle 22 has a straight section 26 which extends downward between those legs 16 and 18. A pair of metal cross bars 28 extend across the frame legs 16 and 18 and are welded thereto as well as to the handle 22. A third cross bar 30 extends across the two legs 16 and 18 more remote from the curved cross member 20.

A separate bracket 32 is welded to and extends from approximately the midpoint of each leg 16 and 18 and bends downward to a plate 34 which is coupled to the remote end of the associated leg, only one bracket 32 is visible in the drawings. Each combination of a bracket 32 and a plate 34 form a support for an axle 36 which extends between those combinations and a separate wheel 38 is rotationally attached to the each end of the axle. Commonly each wheel 38 comprises a metal wheel on which a rubber tire is mounted.

A load platform 40 is coupled across the remote ends of each leg 16 and 18 projecting therefrom in the opposite direction to the side of the frame having the wheel brackets 32 and wheels 38. The load platform 40 is similar to that used to support the objects being carried by previous hand trucks.

A lifting arm 42 is pivotally coupled by a pin 44 to the remote ends of each frame leg 16 and 18 in a manner which allows the lifting arm to rotate into a vertical position, shown in FIG. 1. In this orientation, the lifting arm 42 fits between the two legs and abuts the third cross bar 30, which restrains the lifting arm from pivoting farther backwards toward the wheel bracket 32. A magnet 43 on the lifting arm 42 engages the third cross bar 30 to hold the lifting arm against the frame 12.

However, the lifting arm 42 can be pivoted downward toward the load platform 40, as shown in FIG. 2. A stop 45 attached to one or both of the frame plates 34 prevents the lifting arm 42 from pivoting farther than 45° from vertical, with 30° being the preferred limit. Alternatively, stops 45 may be attached to the legs 16 and 18 of the inverted U-shaped frame member 20. The lifting arm 42 is stable in either the fully vertical or downwardly extending position as shown in FIGS. 1 and 2 respectively.

In the illustrated embodiment, the lifting arm 42 is a rectangular frame sized to fit between the two legs 16 and 18 of the hand truck frame 12. A plurality of pointed teeth 46 project upward from the surface of the lifting arm 42 and are used to bite into the load to be carried by the hand truck, as will be described. The teeth 46 project from the surface of the lifting arm 42 approximately 3.2 mm which is a sufficient distance to bite into the load, comprising goods contained in a box 48 without damaging the integrity or the contents of the box, as will be described. The relative size of the teeth has been exaggerated in the drawings for illustrative purposes.

To use the hand truck 10 to carry a load, such as a large cardboard box 48 containing an item of merchandise. The user pushes the top of the lifting arm 42 away from the frame 12 into the lowered position illustrated in FIG. 2 and places the hand truck adjacent the load 48 with the exposed edge of the platform 40 and the lifting arm teeth 46 facing the box. It should be noted that the lifting arm extends forward of the hand truck a greater distance than the edge of the load platform 40. Thus, when the user pushes the hand truck 10 toward the load, the teeth 46 will contact and bite into the surface of the box 48 before the leading edge of the load platform 40 contacts the lower corner of the box.

As shown in FIG. 3 continued movement of the hand truck 10 toward the box 48 causes the teeth 46 to penetrate the outer layer of the corrugated cardboard side of the box 48. Continued movement of the hand truck causes the lifting arm 42 to raise the side of the box that faces the hand truck 10, thereby tilting the load so that the hand truck platform 40 is able to slide under the box. Thus lifting arm 42 placed into the downward position illustrated in FIG. 2, automatically raises the box 48 as the user pushes the hand truck toward the load. Such raising does not require the user or an assistant to manipulate the load. The automatic pivoting of the lifting arm and raising of the box is aided by limiting the downward position of the lifting arm 42 to less than 45°, with substantially 30° being preferred.

As the hand truck 10 moves closer toward the box 48, the lifting arm 42 pivots toward the frame 12. Eventually the lifting arm 42 pivots to the vertical position and the frame 12 contacts the side of the box, as shown in FIG. 4, at which point the box 48 is supported on the load platform 40. The final pivoting stage of the lifting arm pulls the teeth from the box.

Once the box 48 is fully on the platform 40 as shown in FIG. 4, the user is able to pull on the handle 22 to tilt the hand truck 10 and the load 48 backwards lifting the load platform 40 off the floor. This lifting shifts part of the weight of the load 48 off of the platform and back onto the tilted frame which transfers the weight through the wheels 38. Such lifting operation is the same as is currently practiced with conventional hand trucks that do not incorporate the novel lifting arm 42.

To unload the box 48 the hand truck 10 is tilted downward so that the load platform 40 rests on the floor and the hand truck is pulled away from the load. Because the lifting arm teeth 46 do not engage the box while the lifting arm is in the vertical position when the box is fully on the platform 40, the teeth do not interfere with unloading of the box. The magnet 43 holds the lifting arm 42 against the third cross bar 30 of the frame 12 at this time.

I claim:

1. A hand truck for transporting a load, said hand truck comprising:
    a frame having an upper portion and a lower portion;
    a platform attached to the lower portion of the frame for supporting the load during transport;
    a pair of wheels rotationally connected to the frame; and
    a lifting arm pivotally coupled to the frame and having a device for puncturing the load wherein the load is lifted by the lifting arm to allow the platform to slide underneath the load as the hand truck is moved toward the load.

2. The hand truck as recited in claim 1 wherein the device for puncturating the load comprises at least one tooth attached to the lifting arm.

3. The hand truck as recited in claim 1 wherein the device for puncturating the load comprises a plurality of teeth attached to the lifting arm.

4. The hand truck as recited in claim 1 wherein the lifting arm nests within the frame in a retracted state and pivots to an angle less than 45° with respect to the frame in an extended state.

5. The hand truck as recited in claim 4 wherein the lifting arm in the extended state is limited to an angle of substantially 30° with respect to the frame.

6. The hand truck as recited in claim 4 further including a first stop coupled to the frame to limit the position of the lifting arm in the extended state.

7. The hand truck as recited in claim 6 further including a second stop coupled to the frame to retain the lifting arm in the retracted state.

8. The hand truck as recited in claim 1 wherein the lifting arm comprises a rectangular frame having a first side pivotally coupled to the frame, and an opposing second side.

9. The hand truck as recited in claim 8 wherein the device for puncturing the load comprises a plurality of teeth extending from the second side of the rectangular frame.

10. The hand truck as recited in claim 1 wherein the upper portion of the frame has a handle for grasping by a user of the hand truck.

11. The hand truck as recited in claim 1 wherein the lifting arm is pivotally coupled to the frame at a point that is proximate to the location at which the platform is attached to the frame.

12. The hand truck as recited in claim 1 wherein the pair of wheels are mounted on an axle, and the lifting arm is pivotally coupled to the frame at a point that is below the axle when the load is being lifted by the lifting arm.

13. A hand truck for transporting a load, said hand truck comprising:
    a frame having an inverted U-shaped member, formed by a pair of legs connected by a cross member, and a wheel support connected to ends of the pair of legs which are remote from the cross member;
    a platform attached adjacent to the ends of the pair of legs for supporting the load during transport;
    a pair of wheels rotationally connected to the wheel support; and
    a lifting arm pivotally coupled to the frame and having a at least one tooth for puncturing the load thereby lifting the load to allow the platform to slide underneath the load as the hand truck is moved toward the load.

14. The hand truck as recited in claim 13 wherein the lifting arm nests between the pair of legs in a retracted state, and pivots to an angle less than 45° with respect to the frame in an extended state.

15. The hand truck as recited in claim 14 wherein the lifting arm in the extended state is limited to an angle of substantially 30° with respect to the frame.

16. The hand truck as recited in claim 13 wherein the lifting arm pivots toward the frame as the hand truck is moved toward the load.

17. The hand truck as recited in claim 13 further including a first stop coupled to the frame to limit the position of the lifting arm in the extended state.

18. The hand truck as recited in claim 17 further including a second stop coupled to the frame to retain the lifting arm in the retracted state.

19. The hand truck as recited in claim 13 wherein the lifting arm comprises a rectangular frame having a lower end pivotally coupled to the frame, and an upper side.

20. The hand truck as recited in claim 19 wherein the at least one tooth extends from the upper side of the rectangular frame.

21. The hand truck as recited in claim 13 wherein the lifting arm is pivotally coupled to the frame at a point that is proximate to tile location at which the platform is attached to the frame.

22. The hand truck as recited in claim 13 wherein the wheel are mounted on an axle, and the lifting arm is pivotally coupled to the flame at a point that is below the axle when the load is being lifted by the lifting arm.

* * * * *